United States Patent
Borucki et al.

(10) Patent No.: US 10,990,905 B2
(45) Date of Patent: Apr. 27, 2021

(54) LOCATION-BASED TICKET REDEMPTION

(71) Applicant: NCR Corporation, Duluth, GA (US)

(72) Inventors: Robert Thomas Borucki, Mesa, AZ (US); David Todd Slaughter, Cumming, GA (US)

(73) Assignee: NCR Corporation, Atlanta, GA (US)

( * ) Notice: Subject to any disclaimer, the term of this patent is extended or adjusted under 35 U.S.C. 154(b) by 553 days.

(21) Appl. No.: 14/954,565

(22) Filed: Nov. 30, 2015

(65) Prior Publication Data
US 2017/0154284 A1    Jun. 1, 2017

(51) Int. Cl.
*G07B 15/00* (2011.01)
*G06Q 10/02* (2012.01)
*G06Q 50/14* (2012.01)

(52) U.S. Cl.
CPC ............. *G06Q 10/02* (2013.01); *G07B 15/00* (2013.01); *G06Q 50/14* (2013.01)

(58) Field of Classification Search
CPC ........ G07B 11/00; G07B 15/00; G07B 15/04; G06Q 10/02; G06Q 30/0284; G06Q 2240/00; G06Q 50/30
See application file for complete search history.

(56) References Cited

U.S. PATENT DOCUMENTS

| | | | | |
|---|---|---|---|---|
| 6,085,976 A * | 7/2000 | Sehr | ............... | G06Q 10/02 235/380 |
| 6,119,096 A * | 9/2000 | Mann | ............... | E05G 5/003 705/5 |
| 9,600,946 B1 * | 3/2017 | Gerace | ............... | G07C 9/00103 |
| 2001/0018660 A1 * | 8/2001 | Sehr | ............... | G06Q 10/02 705/5 |
| 2007/0150336 A1 * | 6/2007 | Boily | ............... | G07B 15/00 705/13 |
| 2007/0276944 A1 * | 11/2007 | Samovar | ............... | G07C 9/00103 709/225 |
| 2009/0276250 A1 * | 11/2009 | King | ............... | G06Q 10/02 705/5 |

(Continued)

FOREIGN PATENT DOCUMENTS

| | | |
|---|---|---|
| EP | 1335310 A1 | 8/2003 |
| EP | 1439495 A1 | 7/2004 |
| EP | 2924661 A1 | 9/2015 |

OTHER PUBLICATIONS

Smart Card Alliance, Bluetooth Low Energy (BLE) 101: A Technology Primer with Example Use Cases, Publication No. MNFCC-14001, Jun. 2014 (Year: 2014).*

(Continued)

*Primary Examiner* — Daniel Vetter
(74) *Attorney, Agent, or Firm* — Schwegman, Lundberg & Woessner (57) ABSTRACT

When a consumer carrying a device is automatically detected within a pre-defined and constrained space, ticket identifying information is automatically obtained from the device and relayed to a backend ticket redemption server. The ticket redemption server validates a ticket for the consumer from the ticket-identifying information and relays a confirmation to a ticket redemption agent's device and the consumer is checked-in for ingress onto a transportation system or into a venue destination of the consumer.

19 Claims, 4 Drawing Sheets

(56) References Cited

U.S. PATENT DOCUMENTS

| | | | |
|---|---|---|---|
| 2014/0067490 A1* | 3/2014 | James | G06Q 30/02 |
| | | | 705/13 |
| 2015/0008474 A1 | 1/2015 | van den Brand et al. | |
| 2015/0048159 A1* | 2/2015 | Martinez de Velasco Cortina | ..... |
| | | | G06Q 20/3227 |
| | | | 235/379 |
| 2015/0120558 A1* | 4/2015 | Andrews | G07B 15/00 |
| | | | 705/44 |
| 2015/0178698 A1* | 6/2015 | Schulz | G07B 15/02 |
| | | | 705/13 |
| 2016/0021687 A1* | 1/2016 | Granbery | H04M 17/305 |
| | | | 455/41.2 |
| 2016/0055428 A1* | 2/2016 | Raina | G06Q 50/30 |
| | | | 705/5 |
| 2016/0125323 A1* | 5/2016 | Uenishi | G06Q 30/02 |
| | | | 705/5 |
| 2016/0247338 A1* | 8/2016 | Maor | G07C 9/00111 |
| 2017/0249625 A1* | 8/2017 | Vossoughi | G07B 15/02 |
| 2018/0211021 A1* | 7/2018 | Negi | H04L 63/0838 |

OTHER PUBLICATIONS

Høisæther, et al., Context-awareness for Mobile Ticketing Systems, Norwegian University of Science and Technology Thesis, Jun. 2014 (Year: 2014).*

Narzt, et al., Be-In/Be-Out with Bluetooth Low Energy: Implicit Ticketing for Public Transportation Systems, 2015 IEEE 18th International Conference on Intelligent Transportation Systems, pp. 1551-1556 (Year: 2015).*

European Search Report issued in copending European Patent Application 16184093 dated Apr. 12, 2017.

\* cited by examiner

LOCATION-BASED TICKET REDEMPTION

BACKGROUND

Not many travelers/consumers are fond of large queues to get into their venues. Travelers/consumers do not enjoy fumbling around in their pockets for boarding passes/tickets to provide at a gate or at an entry checkpoint for ingress. Moreover, even with mobile-based barcoded tickets, the travelers/consumers must still take their phones out of their bags or pockets, pull up the appropriate mobile application, locate their ticket barcode, and hand or provide to an agent or scanner for scanning. This is a cumbersome process (even with existing automation available) and contributes to the large queues associated with ingress to a transportation system or a venue. In addition, it places a burden on the proprietor to install scanning equipment at every point at a substantial cost.

Additionally, consumers using mobile tickets (barcode based systems on mobile devices) often awkwardly struggle with the proper way to hold and present the mobile tickets for ticket redemption. Such mobile tickets often include a barcode where the mobile device (typically a phone of the consumer) must be presented to a handheld or stationary scanner. Sometimes, the consumers are unable to do this themselves and elect to just hand their mobile devices over to an agent for proper scanning. The mobile devices may even be dropped in the process, resulting in damage to the consumers' mobile devices or at the very least contributing the queue length for ingress because of the added time that results when the agent is forced to process the scans on behalf of the consumers.

Sometimes, Near Field Communication (NFC) can be used as an alternative to scanning a mobile ticket from a mobile device's display. However, NFC adds to the complexity because the consumer has to properly locate where the mobile device is to be tapped with the NFC-enabled ticket reader. Most consumers struggle with simple display-based scanning and NFC reading is an even more challenging task for them, which means that queue lengths can become even worse for ingress with NFC-based solutions.

SUMMARY

In various embodiments, methods and a system for location-based ticket redemption are provided.

According to an embodiment, a method for location-based ticket redemption is provided. Specifically, a token is received that is initially acquired from a wireless beacon as a customer passes through an ingress point. Next, the token is validated for customer ingress at the ingress point; and an indication is provided at to the success or failure of validation to an ingress device.

DETAILED DESCRIPTION

Figure 1:
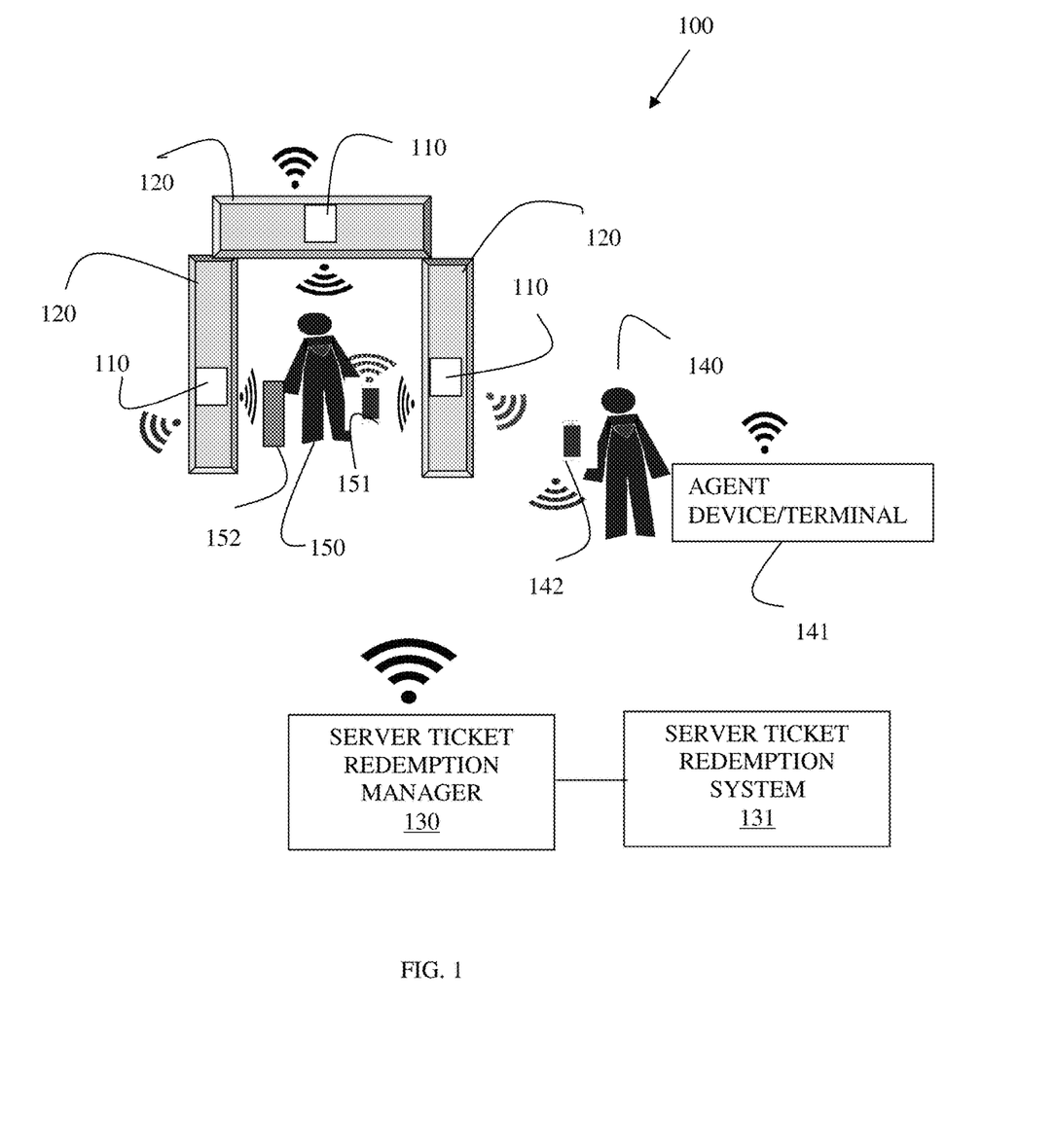
FIG. 1 is a diagram illustrating components of a location-based ticket redemption system, according to an example embodiment.

FIG. 1 is a diagram illustrating components of a location-based ticket redemption system 100, according to an example embodiment. It is to be noted that the location-based ticket redemption system 100 is shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of automated location-based ticket redemption, presented herein and below.

Furthermore, the techniques and the systems presented herein and below (for automated location-based ticket redemption) may include all or some combination of the components shown with the system 100. The methods are programmed as executable instructions in memory and/or non-transitory computer-readable storage media and executed on one or more processors associated with the components/devices.

Specifically, the system 100 includes one or more two-way wireless beacons 110, an ingress portal 120, a server ticket redemption manager 130 (optionally a server ticket redemption system 131), an agent ticket redemption device/terminal 141 (optionally a portable agent ticket redemption device 142) operated by an ticket redemption agent 140, and a consumer portable device 151 in the possession of a consumer 150 (optionally the consumer 150 may have a bag 152). It is to be noted that although a single server is shown in the FIG. 1 that multiple servers may exist for supporting where tickets are actually held for redemption, such that the server ticket redemption manager 130 actually cooperates with a backend server that holds a specific ticket for redemption associated with the customer 150.

The two-way wireless beacons 110 have a limited geographical range and limited ability to transfer and communicate data.

In an embodiment, the two-way wireless beacons 110 are Bluetooth® Low Energy (BLE) two-way beacons 110.

The two-way wireless beacons 110 transmit a signal indicating the presence of the beacons 110 that is automatically detected by the portable device 151 possessed by the consumer 150.

In an embodiment, the portable device 151 is in a pocket of the consumer 150 when the consumer 150 passes through the ingress portal 120.

In an embodiment, the portable device 151 is in the bag 152 when the consumer 150 passes through the ingress portal.

In an embodiment, the Operating System (OS) of the portable device 151 is configured to listen for the beacon transmission of the two-way beacons 110. For example, the OS of Apple®-based devices provides such functionality. When the OS detects the presence of the beacon 110 transmission (which may just include an identifier), the OS is configured to pass the identifier to a mobile application. If that mobile application is not resident (executing) on the portable device 151, then the OS initiates the mobile application on the portable device 151.

In an embodiment, the mobile application is already initiated and executing on the portable device 151 and is in a listening mode for any beacon identifier from the beacons 110. This can occur in a variety of manners. For example, the consumer 150 may have initiated the mobile application and left it running on the portable device 151 at any time prior to the consumer 150 passing through the portal 120. In another case, the OS of the portable device 151 is configured to initiate the mobile application during any startup, power-up, or boot of the portable device 151, such that the mobile application is always running on the portable device 151 in the background.

In an embodiment, the OS is configured to detect the beacon transmission even when wireless features of the device are turned off, such as Bluetooth®. This is the case with newer versions of the Apple®-based OSs.

In an embodiment, when a wireless or cellular-based location resolution service detects that the portable device 151 is within a preconfigured geographical area or geographical distance from a potential two-way wireless beacon 110, then that service automatically turns on BLE services of the portable device 151 and initiates the mobile application, such that the mobile application is in a listening mode for the beacon transmissions. It is noted, that this embodiment is similar to application notification services available on most mobile devices and the BLE services can be enabled through an interface to the OS of the portable device 151.

Once the mobile application is automatically initiated on the portable device 151 (through any of the above-mentioned embodiments and other automatic initiation techniques), the mobile application can directly detect the beacon identifier from the beacon. The mobile application is configured to map the beacon identifier to a specific ticket or token that identifies the specific ticket. The mobile application may also dynamically generate the token that uniquely identifies the ticket. The mobile application then transmits (from the portable device 151) the token (or ticket information), which is received by the two-way wireless beacons 110 and relayed to a network connection or the agent device/terminal 141 (or agent portable device 142) within range of the beacons 110. The token is communicated from the network or from the agent device/terminal 141 (or the agent portable device 142) to the server ticket redemption manager 130.

It is to be noted that the token is used for security and when the beacons 110 are such that they can only handle a small amount of data and the actual ticket information is greater than that amount of information then the beacons 110 can handle. The token represents a smaller version of the ticket that can be mapped to the ticket and the ticket information itself. The token may be generated and supplied by the mobile application of the mobile device 151 based on the ticket information or ticket residing on the mobile device 151 and established ahead of time by the mobile application prior to passing through the portal 120. The token is passed to the server ticket redemption manager 130 and/or a backend ticket processing server (server ticket redemption system 131) where it is converted to actual ticket information or a corresponding ticket as it resides on the mobile application. So, the server ticket redemption manager 130 receives the token and, in an embodiment, passes it to a backend ticket processing server 131, which maps that token to the actual ticket information or the ticket.

In an embodiment, the beacons 110 are preconfigured to listen for transmissions identifying the beacon identifier and pass any data packet provided with the beacon identifier to a network address over a second network to the server ticket redemption manager 130.

In an embodiment, the beacons 110 are preconfigured to simply retransmit the data packet, which is detected by the agent device/terminal 141 (or the portable agent device 142) and then forwarded over a second network to the server ticket redemption manager 130.

Once the server ticket redemption manager 130 receives the token or ticket information for the consumer 150, the token is matched to a specific ticket and a backend system for ticket redemption is accessed by the server ticket redemption manager 130 to verify the ticket for check-in that is being redeemed.

When the server ticket redemption manager 130 successfully validates the ticket for redemption, a confirmation is forwarded from the server ticket redemption manager 130 to the agent device/terminal 141 (and/or the agent portable device 142). This permits the agent 140 to receive verification of the consumer's ticket and ticket information on a display associated with the agent device/terminal 141 (and/or the agent portable device 142).

In an embodiment, the agent device/terminal 141 of the agent portable device 142 sends a beacon identifier with a small confirmation to the beacon 110, which the beacon 110 simply retransmits. The consumer's portable device 151 picks up this signal (assuming within in range) through the mobile application and identifies within the mobile application on the portable device 151 that the ticket has been redeemed.

In an embodiment, the server ticket redemption manager 130 separately sends directly (over a cellular connection or any available WiFi signal a confirmation to the mobile application, so that the mobile application can show on the portable device 151 that the ticket was redeemed.

In an embodiment, the mobile application once it is able to obtain a cellular connection or WiFi signal (assuming one is unavailable to the portable device 151 at the time the ticket is successfully redeemed) synchronizes with the server ticket redemption manager 130 as soon as a wireless connection is available and receives an indication from the server ticket redemption manager 130 that the ticket was successfully redeemed.

In an embodiment, the portal 120 includes a chiming device that receives an indication to chime from the agent device/terminal 141 (and/or the agent portable device 142) when the device 141 and/or 142 receives a confirmation from the server ticket redemption manager 130 that the ticket was successfully redeemed. In this embodiment, the agent 140 may not even have to look at a display of device(s) 141 and/or 142 to recognize that the ticket was successfully redeemed (indicating that the ticket in possession of the consumer 150 through the mobile application executing on the portable device 151) because the chiming device integrated within the portal 120 in proximity to the portal 120 will chime.

In an embodiment of the last embodiment, the chiming device may provide a distinctive different tone in cases where the ticket was not successfully redeemed by the server ticket redemption manager 130. This permits the agent 140 to directly attend to the customer 150 to see what the issue may be with the ticket or lack thereof for the customer 150 to gain ingress into a transportation system (rail, bus, air, etc.) or into a venue (entertainment, etc.).

In an embodiment, the display of device(s) 141 and/or 142 provide a visual denial of the customer 150 ingress when the server ticket redemption manager 130 indicates that the ticket cannot be redeemed.

In an embodiment, both visual confirmation (on display(s) of devices 141 and/or 142) with customer ticket information and a distinctive tone (through a chiming device in vicinity of the portal 120) are provided as customer 150 passes through the portal 120.

It is apparent what the beneficial applications of the system 100 may be. For example, customers 150 can simply pass through a portal 120 with their ticket information accessible to a mobile application on their portable devices 151 and bot the agent 140 and the customers 150 can receive near instantaneous verification or denial of the customers' tickets for ingress. This can happen even when the customers 150 have their portable devices 151 stashed away and not out while passing through the portal 120 (as discussed above).

In an embodiment, the portal 120 includes three or more sides such as what is shown in the FIG. 1.

In an embodiment, the portal 120 is a ticket stall with just two sides that the customers 150 pass through on ingress to a transportation system or venue.

In an embodiment, the portal 120 includes only a single side.

In an embodiment, the portal 120 is not a visible physical structure; rather it is any geofenced area in which the beacons 110 are situated (visible or not), such that the portal 120 may be a hallway, a doorway, a turnstile, a gate, etc. The portal 120 is narrowed to differentiate between ticket holders passing within the geofenced area.

The beacon(s) 110 are affixed to, integrated into, or situated in close proximity to the portal 120.

In an embodiment, a single beacon 110 is used in the system 100.

In an embodiment, two or more beacons 110 are used in the system 100.

In an embodiment, three beacons 110 are used in the system 100 (as shown in the FIG. 1).

In an embodiment, the portal 120 is situated over doors of ingress to a movie theatre where a specific movie is showing. In this embodiment, the ticket redemption may be used to automatically alert theatre personnel when a customer 150 is attempting to view a movie that the customer 150 did not pay for. This often occurs and causes loss of revenue for movie theatres when customers 150 successfully pay for a single movie and then watch multiple different movies. This can also be used to prevent minors from watching a movie that they are not authorized to watch (for example, the ticket server may include information with the ticket that can identify the purchaser as a minor. Alternatively, the mobile app may popup and require the customer 150 to enter a password when passing through the portal where to buy the ticket the purchaser was required to enter a password, etc.

Thus, not only may the system 100 be used for ingress to a transportation system or venue but the system 100 may be utilized for specific locations once the customers 150 are within the venue to ensure that the customers 150 are authorized for access to those specific locations.

The portal 120 is any geofenced specific area or location having an ingress through which the customer 150 must pass.

In an embodiment, during ticket/token validation for a ticket redemption some form of authentication is used, such as encryption or a digital signature, mobile device identifier, mobile application identifier, etc, by the server ticket redemption manager 130 (based on the forwarded information from the beacon 110 and supplied as a data packet(s) by the mobile application of the portable device 151.

These and other embodiments are now discussed with reference to the FIGS. 2-4.

Figure 2:
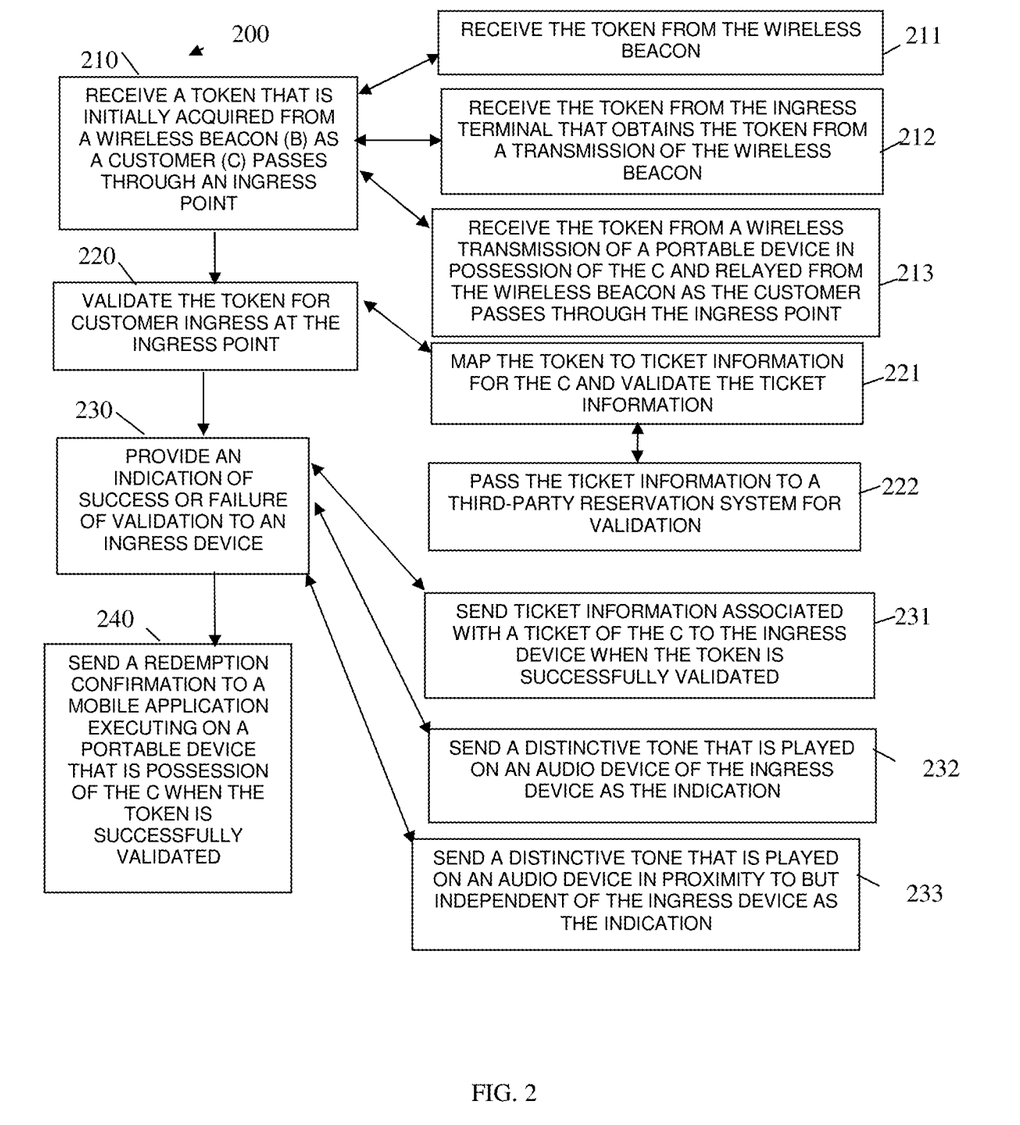
FIG. 2 is a diagram of a method for location-based ticket redemption, according to an example embodiment.

FIG. 2 is a diagram of a method 200 for location-based ticket redemption, according to an example embodiment. The software module(s) that implements the method 200 is referred to as a "ticket redemption manager." The ticket redemption manager is implemented as executable instructions programmed and residing within memory and/or a non-transitory computer-readable (processor-readable) storage medium and executed by one or more processors of a device. The processor(s) of the device that executes the ticket redemption manager are specifically configured and programmed to process the ticket redemption manager. The ticket redemption manager has access to a network during its processing. The network can be wired, wireless, or a combination of wired and wireless.

In an embodiment, the device that executes the ticket redemption manager is a cloud processing environment.

In an embodiment, the device that executes the ticket redemption manager is a remote server that is geographically remote to a consumer's ticket redemption venue.

In an embodiment, the device that executes the ticket redemption is a local server that is local to a consumer's ticket redemption venue.

In an embodiment, the ticket redemption manager is the server ticket redemption manager 130 of the FIG. 1.

At 210, the ticket redemption manager receive a token that is initially acquired from a wireless beacon as a customer passes through an ingress point.

In an embodiment, the ingress point is the portal 120 of the FIG. 1.

In an embodiment, the token is a unique ticket number.

In an embodiment, the token is encrypted.

In an embodiment, the token includes a digital signature.

In an embodiment, the wireless beacon is the two-way wireless beacons 110 of the FIG. 1.

According to an embodiment, at 211, the ticket redemption manager receive the token directly from the wireless beacon over a network connection with which the wireless beacon has access to for accessing the ticket redemption manager.

In an embodiment, at 212, the ticket redemption manager receive the token from an ingress terminal/device that obtains the token from a transmission of the wireless beacon.

In an embodiment, the ingress terminal/device is the agent device/terminal 141 of the FIG. 1.

In an embodiment, the ingress terminal/device is the agent portable device 142 of the FIG. 1.

In an embodiment, at 213, the ticket redemption manager receives the token from a wireless transmission of a portable device in possession of the customer and relays from the wireless beacon as the customer passes through the ingress point.

In an embodiment, the portable device is one of: a mobile phone, a tablet, a laptop, and a wearable processing device.

It is noted that the customer does not have to be operating the portable device. In fact, in an embodiment, the customer is not actively operating or holding in the customer's hand the portable device. In an embodiment, the customer is operating the mobile device but accessing a different application from the mobile application that supplies the token to the wireless beacon. In an embodiment, the portable device is in a pocket of the customer as the customer passes through the ingress point. In an embodiment, the portable device is in a bag that is under the control of the customer as the customer passes through the ingress point.

At 220, the ticket redemption manager validates the token for customer ingress at the ingress point.

According to an embodiment, at 221, the ticket redemption manager maps the token to ticket information for a specific ticket of the customer that permits ingress at the ingress point. The ticket redemption manager then validates the ticket information for the customer.

In an embodiment of 221 and at 222, the ticket redemption manager passes the ticket information to a third-party reservation system to perform the ticket information validation on behalf of the ticket redemption manager.

In an embodiment, the third-party reservation system is the server ticket redemption system 131 of the FIG. 1.

At 230, the ticket redemption manager provides an indication of success or failure of the validation to an ingress device.

In an embodiment, the ingress device is the agent device/terminal 141 of the FIG. 1.

In an embodiment, the ingress device is the agent portable device 142 of the FIG. 1.

According to an embodiment, at 231, the ticket redemption manager sends ticket information associated with a ticket of the customer to the ingress device when the token is successfully validated.

In an embodiment, at 232, the ticket redemption manager sends a distinctive tone that is played on an audio device of the ingress device as the indication of success or failure in validating the token.

In an embodiment, at 233, the ticket redemption manager sends a distinctive tone that is played on an audio device in proximity to but completely independent of the ingress device as the indication of success or failure in validating the token. The independent audio device then plays the distinctive tone over speakers as sounds audible to a human ear.

In an embodiment, at 240, the ticket redemption manager sends a redemption confirmation to a mobile application executing on a portable device that is in possession of the customer (but such mobile application does not have to be actively operated by the customer (although in some cases it may be)). This is done by the ticket redemption manager when the token is successfully validated. This can be done in any of the manners discussed above with reference to the FIG. 1.

Figure 3:
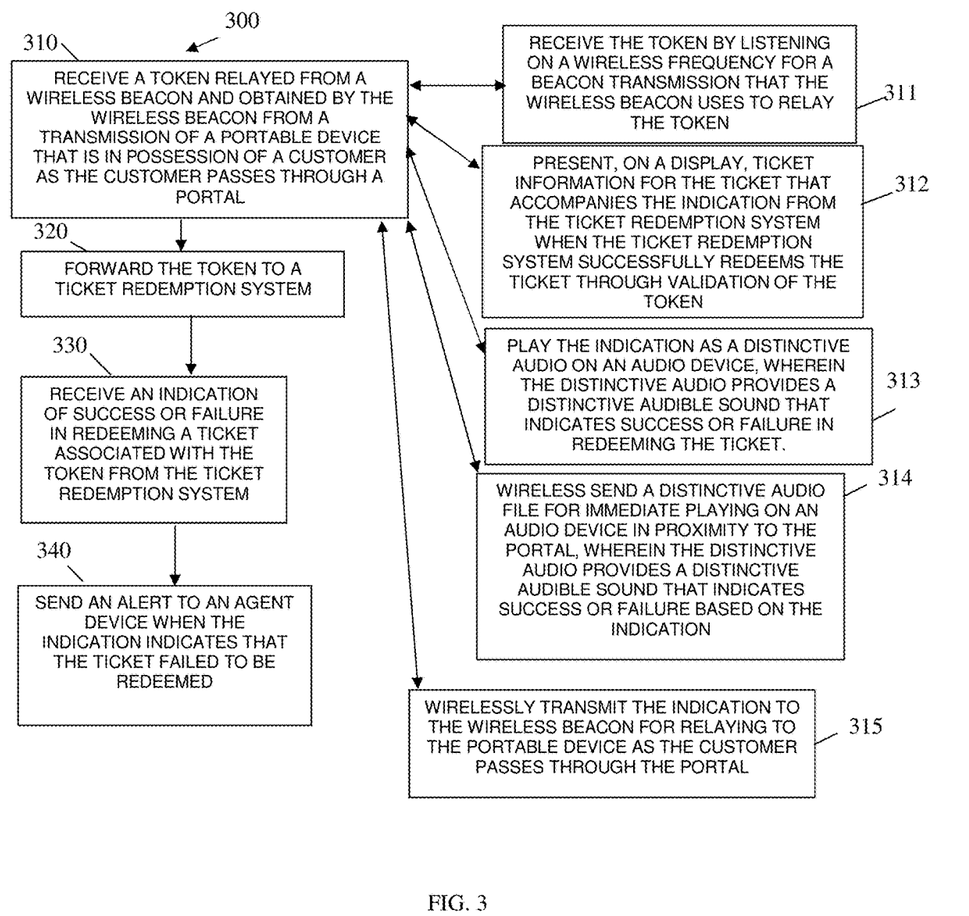
FIG. 3 is a diagram of another method for location-based ticket redemption, according to an example embodiment.

FIG. 3 is a diagram of another method 300 for location-based ticket redemption, according to an example embodiment. The software module(s) that implements the method 300 is referred to as a "ticket redemption controller." The ticket redemption controller is implemented as executable instructions programmed and residing within memory and/or a non-transitory computer-readable (processor-readable) storage medium and executed by one or more processors of a hardware device. The hardware processors that execute the ticket redemption controller are specifically configured and programmed to process the ticket redemption controller. The ticket redemption controller has access to one or more networks during its processing. Each network can be wired, wireless, or a combination of wired and wireless.

In an embodiment, the ticket redemption controller is the agent device/terminal 141 of the FIG. 1.

In an embodiment, the ticket redemption controller is the agent portable device 142 of the FIG. 1.

The device that executes the ticket redemption controller is referred to as an ingress device and is the ingress device discussed above and below herein.

The ticket redemption controller interacts and interfaces over a network connection (wired, wireless, or a combination of wired and wireless) with the method 200 of the FIG. 2 and/or the server ticket redemption manager 130 of the FIG. 1.

At 310, the ticket redemption controller receives a token relayed from a wireless beacon and obtained by the wireless beacon from a transmission of a portable device that is in possession of a customer as the customer passes through a portal.

In an embodiment, the portal is the portal 120 of the FIG. 1.

In an embodiment, the wireless beacon is the wireless beacons 110 of the FIG. 1.

In an embodiment, the wireless beacon is the wireless beacon discussed above with reference to the FIG. 2.

According to an embodiment, at 311, the ticket redemption controller receives the token by listening on a wireless frequency for a beacon transmission that the wireless beacon uses to relay the token.

In an embodiment, the wireless beacon is a two-way BLE beacon.

In an embodiment, at 312, the ticket redemption controller presents on a display of the ingress device ticket information for a ticket that accompanies the indication (see 330 below) from the ticket redemption system (see 320 below) when the ticket redemption system successfully redeems the ticket through validation of the token.

In an embodiment, at 313, the ticket redemption controller plays the indication (see 330 below) as a distinctive audio file for immediate playing on an audio device. The distinctive audio file provides a distinctive audible sound when played that indicates success or failure in redeeming the ticket.

In an embodiment, at 314, the ticket redemption controller wirelessly sends a distinctive audio file for immediate playing on an audio device that is in proximity to the portal. The distinctive audio provides a distinctive audible sound that indicates success or failure based on the indication (see 330 below).

In an embodiment, at 315, the ticket redemption controller wirelessly transmits the indication (see 330 below) to the wireless beacon for relaying to the portable device as the customer passes through the portal. This permits the mobile application (discussed above with reference to the FIG. 1) of the customer and that is executing on the portable device to show the ticket as successfully redeemed.

At 320, the ticket redemption controller forwards the token to a ticket redemption system.

In an embodiment, the ticket redemption system is the server ticket redemption manager 130 of the FIG. 1.

In an embodiment, the ticket redemption system is the method 200 of the FIG. 2.

In an embodiment, the ticket redemption system is the ticket redemption manager 402 of the FIG. 4 (below).

At 330, the ticket redemption controller receives the indication (as discussed above) of success or failure in redeeming a ticket associated with the ticket information from the ticket redemption system.

In an embodiment, at 340, the ticket redemption controller sends an alert to an agent device (separate from the ingress device that is executing the ticket redemption controller) when the indication indicates that the ticket failed to be redeemed. This may be useful in the movie theatre embodiment discussed above with reference to the FIG. 1. It may also be useful for any venue for validating that the customer is authorized to have access to a specific location within that venue.

Figure 4:
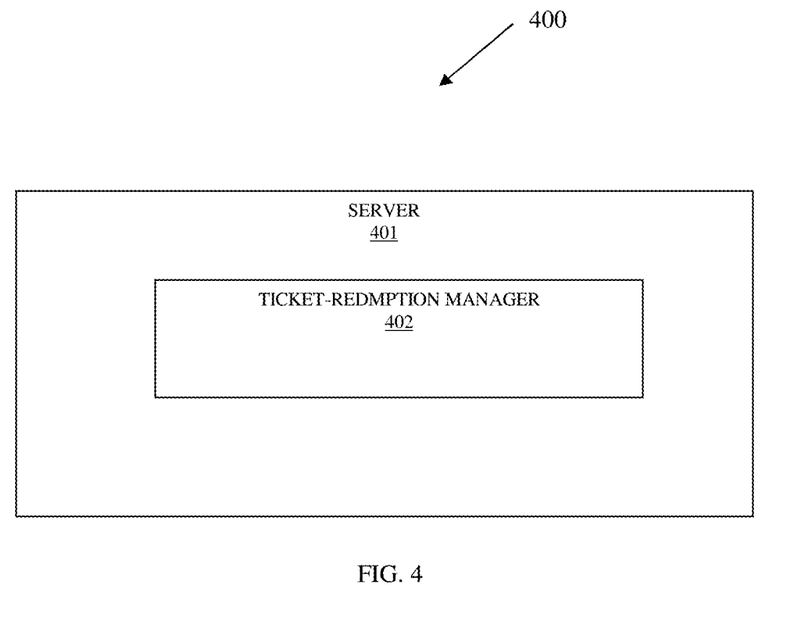
FIG. 4 is a diagram of another location-based ticket redemption system, according to an example embodiment.

FIG. 4 is a diagram of another location-based ticket redemption system 400, according to an example embodiment. Some components of the location-based ticket redemption system 400 are programmed and reside within memory and/or a non-transitory computer-readable medium and execute on one or more processors of the location-based ticket redemption system 400. The location-based ticket redemption system 400 communicates over one or more networks, which can be wired, wireless, or a combination of wired and wireless.

In an embodiment, the location-based ticket redemption system 400 is the system 100 of the FIG. 1.

In an embodiment, the location-based ticket redemption system 400 implements, among other things, the processing discussed in the FIGS. 1 and 3.

The location-based ticket redemption system 400 includes a server 401 and a ticket redemption manager 402.

The ticket redemption manager 402 is configured to: 1) execute on a processor of the server 401, 2) receive a token that was originally obtained by a wireless beacon from a portable device of a customer as a customer passed through an ingress point, 3) validate the token for customer ingress at the ingress point, and 4) send an indication as to success or failure in validation of the token to an ingress device.

In an embodiment, the ingress device is the agent device/terminal 141 of the FIG. 1.

In an embodiment, the ingress device is the agent portable device 142 of the FIG. 1.

In an embodiment, the ingress device is the device that executes the method 300 of the FIG. 3.

In an embodiment, the ingress point is configured as a portal that includes the wireless beacon. In an embodiment, the ingress point is the portal 120 of the FIG. 1.

In an embodiment, the portable device is a mobile phone in possession of the customer and the ingress device is a ticket redemption terminal at the ingress point being operated by a ticket redemption agent.

In an embodiment, the ticket redemption manager 402 is the server ticket redemption manager 130 of the FIG. 1.

In an embodiment, the ticket redemption manager 402 is the method 200 of the FIG. 2.

In an embodiment, the device that is accessible to a consumer is a mobile device operated by the consumer. The mobile device is one of: a phone, a tablet, a wearable processing device, and the like.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
receiving a token that is initially acquired from a wireless beacon as a customer passes through an ingress point of a venue, wherein the token is generated by a portable device that is located in a pocket or bag of the customer, wherein the token is generated based on purchase information for the venue located on the portable device and the token provided by a mobile application of the portable device based on an Operating System (OS) of the portable device detecting a transmitted beacon identifier from the wireless beacon and passing the transmitted beacon identifier to the mobile application for initiating the mobile application for execution on the portable device, wherein the mobile application is not resident or executing on the portable device prior to the passing of the transmitted beacon identifier by the OS to the mobile application, wherein an interface to the OS of the portable device detects when the portable device is within a preconfigured geographical area associated with the wireless beacon and interacts with the OS and initiates wireless services of the portable device when the wireless services are turned off on the portable device and the interface interacts with the OS and initiates the mobile application on the portable device, wherein the wireless beacon is not capable of forwarding a first data size for ticket information that is mapped to the token and associated with the purchase information but is capable of forwarding a second data size associated with the token, wherein the first data size is greater than the second data size;

validating the token for customer ingress at the ingress point based at least in part a digital signature associated with the token;

providing an indication of success or failure of validation to an ingress device;

forwarding a confirmation of success and a beacon identifier for the wireless beacon to the wireless beacon, wherein the wireless beacon retransmits the beacon identifier and the confirmation, the portable device obtains the confirmation, and the mobile application indicates that the ticket information for the token has been properly identified for passing through the ingress point of the venue; and when no cellular connection or WiFi signal is available for communicating with the portable device, sending a confirmation to the portable device as soon as a connection is available indicating that the token was redeemed.

2. The method of claim 1, wherein receiving further includes receiving the token from the wireless beacon.

3. The method of claim 1, wherein receiving further includes receiving the token from an ingress terminal that obtains the token from a transmission of the wireless beacon.

4. The method of claim 1, wherein receiving further includes receiving the token from a wireless transmission of the portable device in possession of the customer and relayed from the wireless beacon as the customer passes through the ingress point.

5. The method of claim 1, wherein validating further includes mapping the token to the ticket information for the customer and validating the ticket information.

6. The method of claim 5, wherein validating the ticket information further includes passing the ticket information to a third-party reservation system for validation.

7. The method of claim 1, wherein providing further includes sending the ticket information associated with a ticket of the customer to the ingress device when the token is successfully validated.

8. The method of claim 1, wherein providing further includes sending a distinctive tone that is played on an audio device of the ingress device as the indication.

9. The method of claim 1, wherein providing further includes sending a distinctive tone that is played on an audio device in proximity to but independent of the ingress device as the indication.

10. The method of claim 1 further comprising, sending a redemption confirmation to the mobile application executing on the portable device that is possession of the customer when the token is successfully validated.

11. A method, comprising:
receiving, on an ingress device, a token relayed from a wireless beacon and obtained by the wireless beacon from a transmission of a portable device that is in a pocket or a bag of a customer as the customer passes through a portal of a venue, wherein the token is generated by the portable device based on ticket information for a ticket purchased by the customer and the token provided by a mobile application of the portable device based on an Operating System (OS) of the portable device detecting a transmitted beacon identifier from the wireless beacon and passing the transmitted beacon identifier to the mobile application for initiating the mobile application for execution on the portable device, wherein the mobile application is not resident or executing on the portable device prior to the passing of the transmitted beacon identifier by the OS to the mobile application, wherein an interface to the OS of the portable device detects when the portable device is within a preconfigured geographical area associated with the wireless beacon and interacts with the OS and initiates wireless services of the portable device when the wireless services are turned off on the portable device and the interface interacts with the OS and initiates the mobile application on the portable device, wherein the wireless beacon is not capable of forwarding a first data size for the ticket information that is mapped to the token but is capable of forwarding a second data size associated with the token, wherein the first data size is greater than the second data size;
forwarding, by the ingress device, the token to a ticket redemption system and forwarding a digital signature associated with the token for validation of the ticket;
receiving, by the ingress device, an indication of success or failure in redeeming the ticket associated with the token from the ticket redemption system;
providing a confirmation of success and a beacon identifier for the wireless beacon to the wireless beacon, wherein the wireless beacon retransmits the the beacon identifier and the confirmation, the portable device obtains the confirmation, and the mobile application indicates that the ticket information for the token has been properly identified for passing through the portal of the venue; and
when no cellular connection or WiFi signal is available to communicate with the portable device, sending, by the ticket redemption system, a confirmation to the portable device as soon as a connection is available indicating that the ticket was redeemed.

12. The method of claim 11, wherein receiving further includes receiving the token by listening on a wireless frequency for a beacon transmission that the wireless beacon uses to relay the token.

13. The method of claim 11, wherein receiving further includes presenting, on a display of the ingress device, ticket information for the ticket that accompanies the indication from the ticket redemption system when the ticket redemption system successfully redeems the ticket through validation of the token.

14. The method of claim 11, wherein receiving further includes playing the indication as a distinctive audio on an audio device interfaced to the ingress device, wherein the distinctive audio provides a distinctive audible sound that indicates success or failure in redeeming the ticket.

15. The method of claim 11, wherein receiving further includes wireless sending a distinctive audio file for immediate playing on an audio device in proximity to the portal, wherein the distinctive audio provides a distinctive audible sound that indicates success or failure based on the indication.

16. The method of claim 11 further comprising, sending an alert to an agent device when the indication indicates that the ticket failed to be redeemed.

17. A system, comprising:
a server;
a ticket redemption manager configured to: i) execute on a processor of the server, ii) receive a token that was originally obtained by a wireless beacon from a portable device located in a bag or pocket of a customer as a customer passed through an ingress point of a venue, wherein the token is generated by the portable device based on purchase information for the venue located on the portable device and the token provided by a mobile application of the portable device based on an Operating System (OS) of the portable device detecting a transmitted beacon identifier from the wireless beacon and passing the transmitted beacon identifier to the mobile application for initiating the mobile application for execution on the portable device, wherein the mobile application is not resident or executing on the portable device prior to the passing of the transmitted beacon identifier by the OS to the mobile application, wherein an interface to the OS of the portable device detects when the portable device is within a preconfigured geographical area associated with the wireless beacon and interacts with the OS and initiates wireless services of the portable device when the wireless services are turned off on the portable device and the interface interacts with the OS and initiates the mobile application on the portable device, wherein the wireless beacon is not capable of forwarding a first data size for ticket information that is mapped to the token and the purchase information but is capable of forwarding a second data size associated with the token, wherein the first data size is greater than the second data size, iii) validate the token for customer ingress at the ingress point based at least in part on a digital signature associated with the token, iv) send an indication as to success or failure in validation of the token to an ingress device; v) provide a confirmation of success and a beacon identifier for the wireless beacon to the wireless beacon, wherein the wireless beacon retransmits the beacon identifier and the confirmation, the portable device obtains the confirmation, and the mobile application indicates that the ticket information for the token has been properly identified for passing through the ingress point of the venue, and vi) when no cellular connection or WiFi signal is available to communicate with the portable device send a confirmation to the portable device as soon as a connection is available indicating that the token was redeemed.

18. The system of claim 17, wherein the ingress point is configured as a portal that includes the wireless beacon.

19. The system of claim 17, wherein the portable device is a mobile phone in possession of the customer and the ingress device is a ticket redemption terminal at the ingress point being operated by a ticket redemption agent.

* * * * *